United States Patent
Aikin et al.

(10) Patent No.: US 10,059,228 B1
(45) Date of Patent: Aug. 28, 2018

(54) HAPTIC FEEDBACK FOR DYNAMIC SEATING SYSTEM

(71) Applicants: Randol W. Aikin, San Francisco, CA (US); Filip Ilievski, Foster City, CA (US)

(72) Inventors: Randol W. Aikin, San Francisco, CA (US); Filip Ilievski, Foster City, CA (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 15/269,208

(22) Filed: Sep. 19, 2016

Related U.S. Application Data (60) Provisional application No. 62/233,720, filed on Sep. 28, 2015.

(51) Int. Cl.
*B60N 2/02* (2006.01)
*B60R 22/28* (2006.01)

(52) U.S. Cl.
CPC ......... *B60N 2/0232* (2013.01); *B60N 2/0244* (2013.01); *B60R 22/28* (2013.01)

(58) Field of Classification Search
CPC ...... B60N 2/0232; B60N 2/0244; B60R 22/28
See application file for complete search history.

(56) References Cited

U.S. PATENT DOCUMENTS

| | | | | |
|---|---|---|---|---|
| 4,384,735 | A * | 5/1983 | Maeda | B60N 2/02 242/385 |
| 5,900,677 | A * | 5/1999 | Musiol | B60R 21/01512 180/208 |
| 6,019,428 | A * | 2/2000 | Coffield | A47C 7/46 297/284.1 |
| 6,516,258 | B1 * | 2/2003 | Herrmann | B60R 21/013 180/232 |
| 8,554,461 | B2 * | 10/2013 | Cuddihy | B60R 21/0134 340/436 |
| 8,942,892 | B2 * | 1/2015 | Veen | B60N 2/0232 297/217.3 |
| 2003/0025601 | A1 * | 2/2003 | Gruteser | A47C 15/004 340/540 |
| 2006/0012159 | A1 * | 1/2006 | Kore | B60R 21/18 280/733 |
| 2012/0226418 | A1 * | 9/2012 | Veen | B60N 2/0232 701/49 |
| 2016/0107570 | A1 * | 4/2016 | Modarres | B60Q 9/008 340/435 |

FOREIGN PATENT DOCUMENTS

WO 2001045985 A1 6/2001

* cited by examiner

*Primary Examiner* — Thomas Ingram
(74) *Attorney, Agent, or Firm* — Young Basile Hanlon & MacFarlane, P.C.

(57) ABSTRACT

A dynamic seating system includes one or more vehicle sensors that output information describing one or more operating characteristics of a vehicle; a calculation unit configured to determine a feedback level based on a degree of deviation of the one or more operating characteristics of the vehicle from a predetermined state; and a seating assembly configured to actuate based on the feedback level.

20 Claims, 5 Drawing Sheets

HAPTIC FEEDBACK FOR DYNAMIC SEATING SYSTEM

CROSS-REFERENCE TO RELATED APPLICATIONS

This application claims the benefit of U.S. Provisional Patent Application No. 62/233,720, which was filed on Sep. 28, 2015.

FIELD

The application relates generally to seating systems for vehicles. More particularly, described embodiments relate to a dynamic seating system configured to provide haptic feedback to the occupants of a vehicle.

BACKGROUND

Passive safety systems for vehicles may include pre-tensioners, which reduce the slack in a seatbelt restraint when a collision is detected; inflatable seatbelt harnesses for better load distribution; and inflatable seat bolsters for improved lateral support during a collision.

These passive safety systems are typically used only once a collision has already occurred. Further, because these passive safety systems require extremely fast reaction times, many are destructive, that is, they are capable of being used only once before requiring replacement.

Some active communications systems include audible or visual warnings to alert occupants to different conditions relative to a vehicle. For example, lane-keeping systems may generate a beeping sound or display a visual icon to alert the occupant if the vehicle drifts too close to a lane line while in operation.

SUMMARY

One aspect of the disclosed embodiments is a dynamic seating system that includes one or more vehicle sensors that output information describing one or more operating characteristics of a vehicle; a calculation unit configured to determine a feedback level based on a degree of deviation of the one or more operating characteristics of the vehicle from a predetermined state; and a seating assembly configured to actuate based on the feedback level.

Another aspect of the disclosed embodiments is a method for providing haptic feedback. The method includes receiving external information relating to conditions that are external to the vehicle; determining that feedback is to be applied based on the external information; calculating a feedback level based on a degree of deviation of the external environment information from a predetermined state; and actuating a seating assembly based on the feedback level.

Another aspect of the disclosed embodiments is a method for controlling a seating system. The method includes receiving information describing one or more notifications; calculating a feedback command based on the notification; and causing actuation of a seat component by transmitting the feedback command to the seat component.

DETAILED DESCRIPTION

The following disclosure relates to a dynamic seating system configured to provide unobtrusive haptic feedback to occupants of a vehicle by actuating the seats and/or passive restraints of the vehicle. The occupants of the vehicle may include a driver and/or passengers, and haptic feedback may be provided to the driver and the passengers.

With the advent of improved vehicle intelligence capable of monitoring nearby vehicles, occupant behavior, external resources, and the driving environment, traditionally passive components can be made intelligent, providing additional feedback to occupants during regarding conditions relative to the vehicle while at the same time allowing communication, occupant movement, and improved comfort during lower risk situations. Additionally, by adjusting various components within the dynamic seating system, the seating system can provide information to the occupants using haptic feedback, such as information relating to the environment around the vehicle.

Actuating the dynamic seating system, including vibrating the seat and/or restraint, changing the seat height and/or the seat back angle, and/or modifying the tension or inflation of the restraint, may also improve functionality of passive safety systems for all vehicle occupants. By communicating changes in the driving environment or notifications from external resources using the dynamic seating system, it is possible to alert the occupants to communications or increased risk without the use of potentially distracting audible or visual signals.

Figure 1:
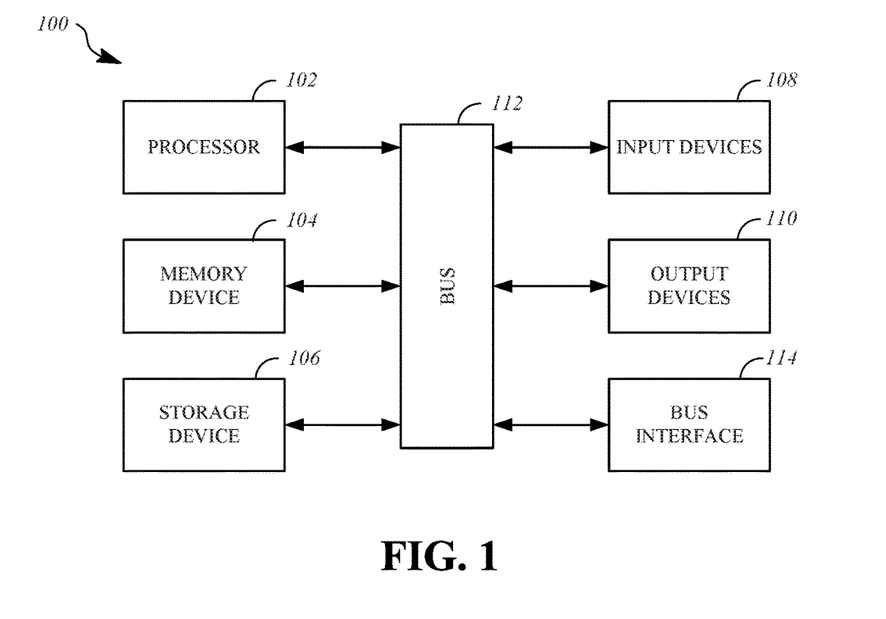
FIG. 1 is a block diagram showing an example of a computing device.

FIG. 1 shows an example of a computing device 100 that can be utilized in the dynamic seating system described herein. The computing device 100 can be a single computing device, housed, for example, in a vehicle head unit, or be a separate device such as a desktop computer, a laptop computer, a tablet, or a mobile telephone. Alternatively, the computing device 100 can be a system that includes multiple computing devices working cooperatively.

In the illustrated example, the computing device 100 includes a processor 102, a memory device 104, a storage device 106, one or more input devices 108, and one or more output devices 110, which are interconnected by a bus 112. The computing device 100 can also include a bus interface 114 for connecting peripheral devices to the bus 112.

The processor 102 can be any type of device that is able to process or manipulate information, including devices that are currently known and devices that may be developed in the future. As an example, the processor 102 can be a conventional central processing unit (CPU). Although the illustrated example shows a single processor, multiple processors can be utilized instead of a single processor.

The memory device 104 is utilized to store information for immediate use by the processor 102. The memory device 104 includes either or both of a random access memory (RAM) device and a read only memory (ROM) device. The memory device 104 can be utilized to store information, such as program instructions that can be executed by the processor 102, and data that is stored by and retrieved by the processor 102. In addition, portions of the operating system of the computing device 100 and other applications that are being executed by the computing device 100 can be stored by the memory device during operation of the computing device 100.

The storage device 106 is utilized to store large amounts of data persistently. As examples, the storage device 106 can be a hard disk drive or a solid-state drive.

The input devices 108 can include any type of device that is operable to generate computer interpretable signals or data in response to user interaction with the computing device 100, such as physical interaction, verbal interaction, or non-contacting gestural interaction. As examples, the input devices 108 can include one or more of a keyboard, a mouse, a touch-sensitive panel with or without an associated display, a trackball, a stylus, a microphone, a camera, or a three-dimensional motion capture device. The input devices 108 can also include any type of device that is operable to transfer computer interpretable signals or data to the computing device 100, such as sensors or mobile devices.

The output devices 110 can include any type of device that is able to relay information in a manner that can be perceived by a user or utilized by another device. As examples, the output devices 110 can include one or more of an LCD display screen, an LED display screen, a CRT display screen, a printer, an audio output device such as a speaker, a haptic output device, a data port such as a USB or HDMI connector, etc. In some implementations, the output devices 110 include a display screen and the input devices 108 include a touch-sensitive panel that is integrated into the display screen to define a touch-sensitive display screen.

The bus 112 can transfer signals and/or data between the components of the computing device 100. Although depicted as a single bus, it should be understood that multiple or varying types of buses could be utilized to interconnect the components of the computing device 100. The bus interface 114 can be any type of device that allows other devices, whether internal or external, to connect to the bus 112.

Figure 2:
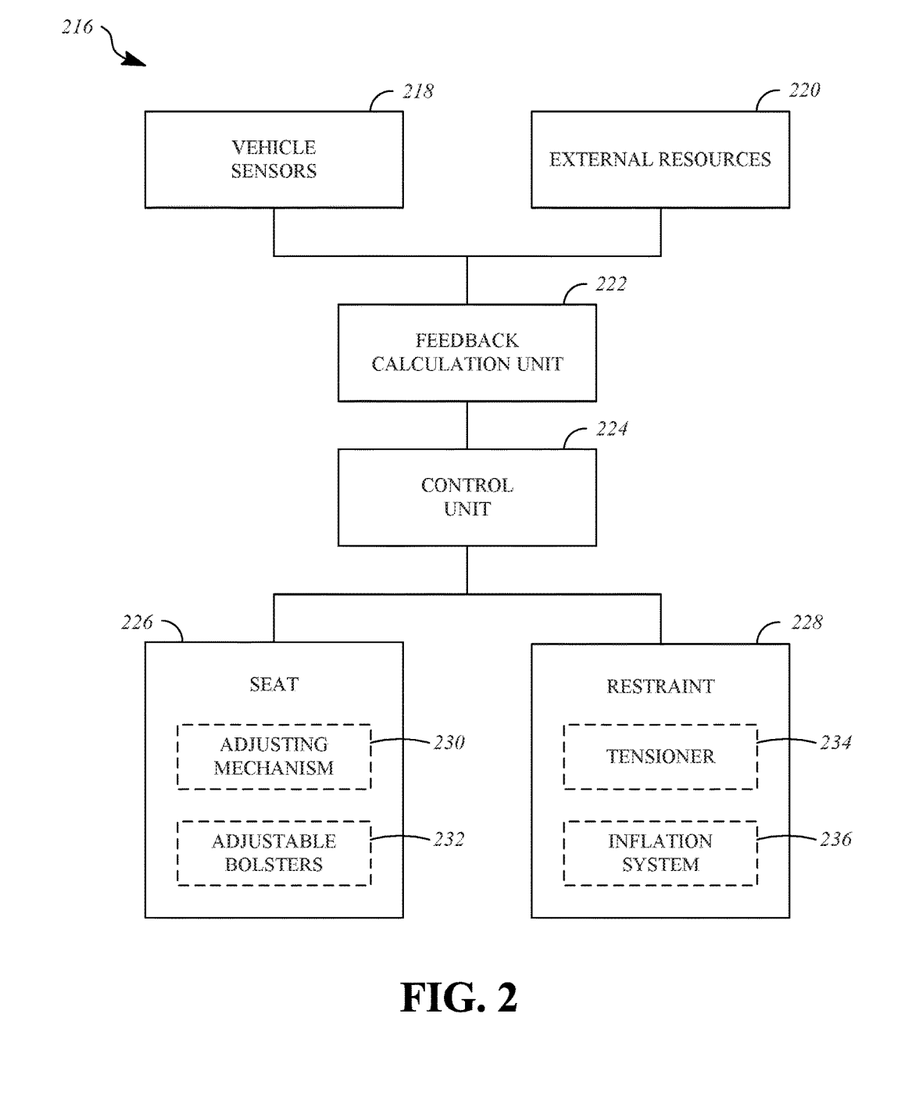
FIG. 2 is a schematic diagram of a dynamic seating system.

FIG. 2 shows a schematic diagram of a dynamic seating system 216. The dynamic seating system 216 can consist of several components: one or more vehicle sensors 218 serving as a source of both occupant and vehicle information; one or more external resources 220 serving as a source of both external device information and external environment information relating to conditions external to the vehicle; a feedback calculation unit 222 configured to determine a feedback level for the dynamic seating system 216 based on occupant, vehicle, external device, and external environment information; and a control unit 224 designed to vibrate and/or reposition at least some components within a seating assembly, such as a seat 226 and a restraint 228, based on the feedback level determined by the feedback calculation unit 222. The seat 226 may be utilized at any or all of the seating positions of the vehicle.

The feedback calculation unit 222 and the control unit 224 can be applications stored in the memory device 104 and executed using the processor 102 of the computing device 100 of FIG. 1. Alternatively, the feedback calculation unit 222 and the control unit 224 can communicate with a standalone controller or be integrated into another vehicle control unit. The primary task of the control unit 224 is to issue commands to modify the various settings and/or positions associated with seating assembly components such as the seat 226 and the restraint 228 based on a feedback level determined by the feedback calculation unit 222.

The vehicle sensors 218 can be configured to provide vehicle parameters to the feedback calculation unit 222. The vehicle parameters can include, for example, vehicle speed, vehicle acceleration, vehicle yaw rate, wheel slip, engine throttle state, braking state, or any other vehicle parameter.

The feedback level may be calculated by the feedback calculation unit 222 based on a comparison of the occupant information, the vehicle information, the external device information, and/or external environment information to predetermined values, such as by setting the feedback level according to a deviation of the occupant information, the vehicle information, the external device information, and/or the external environment information from the predetermined values. In one example, the feedback calculation unit 222 can assess an increased need for haptic feedback by monitoring lateral and longitudinal wheel slip. As wheel slip increases, the vehicle can approach operational friction limits. Approaching friction limits can occur during aggressive driving maneuvers or in poor weather and can increase the risk of the vehicle becoming unstable. In another example, the vehicle sensors 218 can include accelerometers and an inertial measurement unit (IMU) measuring lateral and longitudinal acceleration, yaw rate, and longitudinal velocity. High acceleration and velocity levels can also be associated with aggressive driving and instability.

In vehicles equipped with radar, LIDAR, and/or vision systems, nearby vehicles or other obstacles can be identified and tracked. Object information such as range, range rate, and classification can be weighed by the feedback calculation unit 222. In one example, a proximate position and/or erratic dynamic behavior associated with a nearby vehicle or other object can indicate a need for change in the haptic feedback level of the dynamic seating system 216.

The vehicle sensors 218 can also be configured to provide external environment information to the feedback calculation unit 222. The external environment information can include, for example, local temperature and weather conditions, the time of day, visibility level, road conditions such as wet, dry, icy, or snowy, and other information relating to the external environment in which the vehicle operates. The need to provide a change in feedback level can be assessed by the feedback calculation unit 222 based at least in part on one or more of these environmental conditions.

The vehicle sensors 218 can also be configured to provide occupant information such as the occupant's age, reaction time, distraction level, drowsiness, gaze-direction, breathing rate, temperature, height, weight, and other information relating to the physical characteristics and condition of the occupant. The feedback calculation unit 222 can determine the feedback level based at least in part on one or more of these occupant parameters. In some cases, it is possible that the occupant information may include sensitive information relating to the occupants of a vehicle. Because of this, the dynamic seating system 216 can include measures that respect and protect the privacy interests of the occupants, such as by, for example, storing occupant information only on an opt-in basis, allowing user control over what occupant information if any is stored and for how long, and encrypting the stored occupant information.

In one example, the external resources 220 can be used to assess the location where a vehicle is operating. The external resources 220 can provide historical traffic and crash information, potentially in collaboration with information gathered by insurance agencies, such that the feedback calculation unit 222 can determine the feedback level. For example, certain urban areas may have historically higher crash rates than many rural areas. In another example, some intersections may have more traffic at some times of the day than at other times, affecting the feedback level.

The external resources 220 can also include, for example, a user device or an entertainment system. In the case where the external resource 220 is a user device, such as a smart phone, external device information, such as notifications or alerts on the smart phone, can be communicated to the occupant by varying the feedback level of the dynamic seating system 216, such as by varying a vibration level. For example, a first state in which no alerts are present may correspond to absence of feedback, and the feedback level may increase as the number of alerts increases. Again, the feedback calculation unit 222 can assess feedback level for the dynamic seating system 216 based at least in part on the information provided from these external resources 220.

The feedback calculation unit 222 can weigh each of the above parameters to determine a haptic feedback level for the dynamic seating system 216. If a change in haptic feedback level is required in order to orient an occupant to external resources 220, vehicle conditions, or external environment conditions, the control unit 224 can be configured to send a command to the seat 226 and/or the restraint 228 to actuate a component, portion, or function of the seat 226 and/or the restraint.

The feedback provided by the seat 226 and/or the restraint 228 in response to the command from the feedback calculation 222 unit may provide a notification to the occupant. The notification may be triggered by information from the external resources 220, such as the external device, which is received by the feedback calculation unit 222. The feedback level may be based on a number of notifications, or a type of one or more of the notifications. As an example, if the vehicle is driving autonomously, the seat 226 could be actuated to change position from a recumbent position to an upright position as a notification to the occupant that the vehicle is nearing its destination. Similarly, vibration of the seat 226 could be used to provide a notification to the occupant regarding presence of a particular location of interest; to provide a notification for an email message, to provide a notification for a text message, to provide a notification of a phone call; or to provide a notification to wake the occupant as an alarm clock. As another example, feedback provided by the seat 226 could also be used to indicate the intent of the autonomous vehicle to the occupants. For instance, if the vehicle is changing lanes or making a turn, it can provide a localized vibration in the seat 225 to indicate the intended action. This allows information to be provided to the occupant without the occupant touching a control, such as a steering wheel or pedals, and without the occupant viewing a particular instrument, indicator, or display screen. Similarly, pre-tensioning restraint 228 could alert the occupant about a sudden braking or acceleration event, which may, for example, allow the occupant to avoid dropping an item or spilling a drink.

In some embodiments, the seat 226 includes an adjusting mechanism 230, and the command from the control unit 224 may cause the adjusting mechanism 230 to change a seating position of the occupant based on the haptic feedback level. As an example, the adjusting mechanism may include components such as electric motors and mechanical interconnections that allow the position of the seat 226 to be changed with respect to the vehicle such as by translating or rotating, or allow the relative positions of components such as a seat cushion 240 and a seat back 238 to be modified such as by changing the seat back angle of the seat 226. As one example, the adjusting mechanism 230 may move the seat 226 between a first seat height and a second seat height. As another example, the adjusting mechanism 230 may move the seat between a first seat back inclination and a second seat back inclination.

In some embodiments, the command from the control unit 224 may cause vibration of the seat 226 based on the haptic feedback level. As an example, vibrations may be induced in the seat 226 using a vibratory device such as electric motors that are associated with the adjusting mechanism 230. As one example, the command from the control unit 224 may switch vibration from an off state in which vibration is not applied to an on state in which vibration is applied. As another example, the command from the control unit 224 may switch vibration from a first non-zero intensity level to a second non-zero intensity level.

In some embodiments, the seat 226 includes adjustable bolsters 232, and the command from the control unit 224 may cause the adjusting mechanism 230 to increase or decrease a bolster level of the adjustable bolsters 232 based on the haptic feedback level. In some implementations, the adjustable bolsters 232 are inflatable structures that change bolster levels by inflating and deflating. In other implementations, the adjustable bolsters 232 may include non-inflatable components that move in order to change the bolster level of the adjustable bolsters. As another example, the command from the control unit 224 may switch the bolster level from a zero bolster level or a first non-zero bolster level to a second non-zero bolster level.

In some embodiments, the restraint 228 includes a tensioner 234. The tensioner 234 may be an electrically operated device that is operable to extend and retract a portion of the restraint 228 such as a seat belt, and thereby increase or decrease the tension applied by the restraint 228. The command from the control unit 224 may cause the tensioner 234 to increase or decrease tension in the restraint 228 based on the haptic feedback level. As another example, the command from the control unit 224 may cause the tensioner to change the tension in the restraint 228 from a first non-zero tension level to a second non-zero tension level.

In some embodiments, the restraint 228 includes an inflation system 236. The inflation system 236 is operable to inflate and deflate a portion of the restraint 228. The command from the control unit 224 may cause the inflation system 236 to increase or decrease an inflation level of the restraint 228 based on the haptic feedback level. As one example, the command from the control unit 224 may switch the restraint inflation level from an off state in which the restraint 228 is not inflated by the inflation system 236 to an on state in which the restraint 228 is inflated by the inflation system 236. As another example, the command from the control unit 224 may switch the restraint inflation level from a first non-zero inflation level to a second non-zero inflation level.

Figure 3:
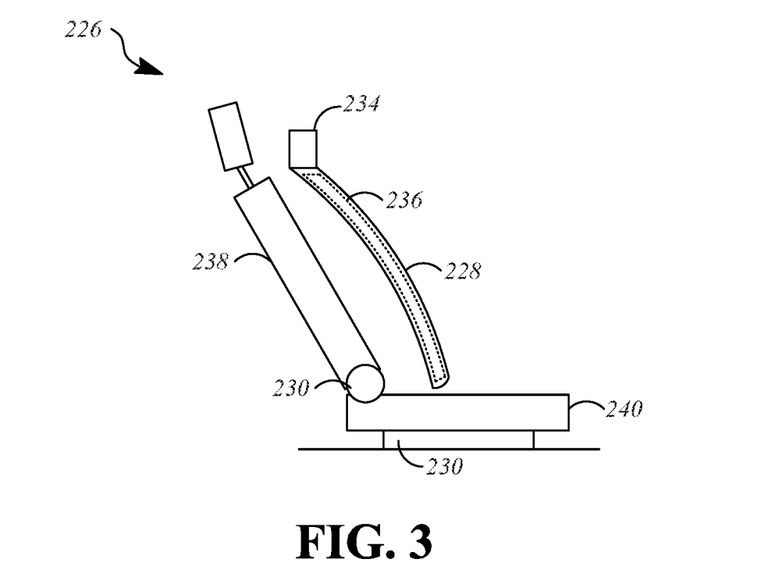
FIG. 3 is a side view of the dynamic seating system of FIG. 2 in a first position.

FIG. 3 shows a side view of the dynamic seating system 216 of FIG. 2 in a first position. The first position shown provides a relaxed or absent feedback level to the occupant. For example, during autonomous operation or most manually controlled vehicle situations, the positions and settings applied to the seat 226 and/or the restraint 228 can be adjusted according to the occupant's preferred comfort setting. In some embodiments, the occupant's preferred comfort setting is an occupant-defined setting. As an example, the seat 226 may be located in a relaxed position, such as a reclined position as in the illustrated example, and the tension of the restraint 228 may be set to provide a high level of comfort and maneuverability, such as snug but not tight fitting, in the occupant's preferred comfort setting.

The feedback calculation unit 222 can determine whether feedback is to be applied based on one or more operating characteristics of the vehicle, such as by comparing the one or more operating characteristics of the vehicle to a predetermined state. The feedback calculation unit may determine that a relaxed or absent feedback level is appropriate for the dynamic seating system 216, such as in response to determining that the one or more parameters are within predetermined ranges. The relaxed or absent feedback level may correspond, for example, to the occupant's preferred comfort setting. Values or ranges for vehicle operating characteristics that correspond to the relaxed or absent feedback level may be referred to herein as nominal states. Information utilized by the feedback calculation unit 222 as a basis for determining that the relaxed or absent feedback level is appropriate may be received from the vehicle sensors 218 and/or the external resources 220 and may indicate, for example, that wheel slip is well under friction limits, vehicle acceleration and velocity are at median levels, there are no proximate objects in the environment, the weather is pleasant, and/or the vehicle is located in a sparsely populated area with a history of few crashes.

The relaxed or absent feedback level shown for the dynamic seating system 216 in FIG. 3 can be present before a change in haptic feedback level occurs in order to alert the occupant to a notification from an external resource 220, such as a smart phone. In this example, the feedback calculation unit 222 can receive external device information from the external resource 220 before sending a command to the seating assembly to actuate using a brief dynamic response, such as a pulse or vibration, for example, in the seat 226 and/or the restraint 228. The pulse or vibration may be applied by one or more of the adjusting mechanism 230, the adjustable bolsters 232, the tensioner 234, the inflation system 236, and other portions of the seat 226 and the restraint 228.

Figure 4:
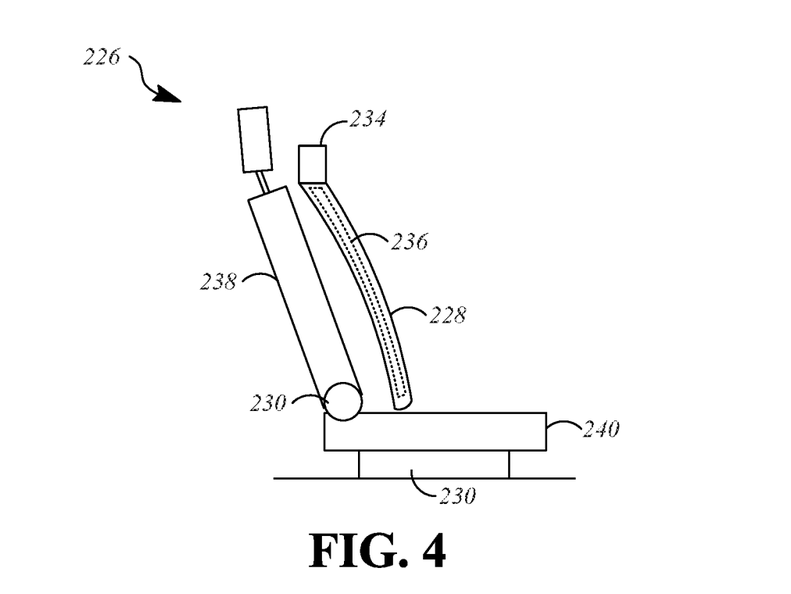
FIG. 4 is a side view of the dynamic seating system of FIG. 2 in a second position.

FIG. 4 shows a side view of the dynamic seating system 216 of FIG. 2 in a second position. In this second position, the back of the seat 226 has a lesser inclination or recline as compared to the first position of FIG. 3. In addition, tension in the restraint 228 has been increased in comparison to the first position of FIG. 3, as shown by the restraint 228 being closer to the back of the seat 226 in FIG. 4 than in FIG. 3. Finally, the height of the seat cushion 240 of the seat 226 has been raised slightly in FIG. 4 as compared to FIG. 3.

The haptic feedback provided by the second position can be warranted when the feedback calculation unit 222 receives an indication from one of the vehicle sensors 218 that the vehicle is planning a change from autonomous operation to manual operation. In this case, the haptic feedback can be provided by the control unit 224 to actuate the dynamic seating system 216 to move components of the seating assembly from the first position to the second position by sending a command to move the seat 226 to force a higher, more erect posture for the occupant by changing the inclination and height of the seat 226. This change provides an optimal viewing angle of the environment and sends a signal that it is time for the occupant, in this case, the driver, to take manual control of the vehicle.

Similar haptic feedback can be provided by the dynamic seating system 216 during solely manually controlled vehicle operation. For example, if adverse driving conditions or aggressive driving behaviors are detected by any of the vehicle sensors 218, the inclination of the back of the seat 226 and the tension of the restraint 228 can be adjusted for the driver and/or the passengers in order to provide a "sport" or "racing" feel, increasing the driver's control of the vehicle and improving safety while at the same time implicitly communicating to the driver that added caution is necessary.

The feedback level applied by the control unit 224 may vary based upon the state of the vehicle, as indicated by, for example, information received from the vehicle sensors 218 and/or the external resources 220. The control unit 224 may be configured to apply multiple feedback levels, which may correspond to discrete settings or non-discrete settings such as values for positions or states that are calculated based on inputs. In some embodiments, the feedback level applied by the control unit 224 may be based on a degree by which the vehicle operating characteristics deviate from a predetermined value, such as the previously described nominal states for the operating characteristics. Thus, for example, higher intensity feedback may be applied as the degree of deviations of the vehicle operating characteristics from the predetermined values or states increase.

Figure 5:
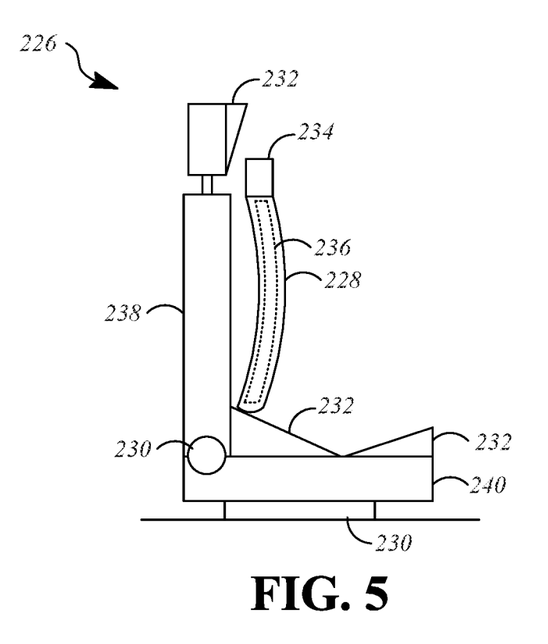
FIG. 5 is a side view of the dynamic seating system of FIG. 2 in a third position.

FIG. 5 shows a side view of the dynamic seating system 216 of FIG. 2 in a third position. In this example, the seating assembly includes the seat 226, the restraint 228, and several adjustable bolsters 232. In the third position, the back of the seat 226 is approximately vertical, and tension in the restraint 228 has been increased in comparison to FIG. 4. In addition, several of the adjustable bolsters 232—one in the headrest, one under the knees, and one under the tailbone of the occupant—have been inflated or expanded. This third position represents a high level of haptic feedback, which can be provided to the occupant, for example, when there is a condition relative to the vehicle that needs to be brought to the occupant's attention.

In response to the feedback level, adjusting the dynamic seating system 216 may be performed by optimizing the settings of the dynamic seating system 216 to enhance operation of passive safety features, such as the restraint 228. As examples, expanding the adjustable bolster 232 located in the under-knee position of the seat 226 can prevent "submarining," tightening the restraint 228 can pull the occupant securely into the seat, and expanding the adjustable bolsters 232 that are located in the head and tailbone areas of the seat 226 can further "hug" the occupant to the seat 226.

Increasing the tension in the restraint 228 using the tensioner 234 can also enhance operation of passive safety features. The restraint 228 can likewise be inflated or deflated using the inflation system 236 instead of tightened or loosened. Increasing the inflation level of the restraint 228 using the inflation system 236 will also increase the tension felt by the occupant. Further, inflation of the restraint 228 may distribute the pressure more evenly across the torso of the occupant.

By providing better support in the seat 226 and tighter tension in the restraint 228, and by more uniformly distributing the pressure applied by the seat 226 and the restraint 228 to the occupant, the dynamic seating system 216 can enhance operation of other passive safety systems. For example, airbags can be controlled to actuate based on the known position of the occupant within the seat 226 as provided by the dynamic seating system 216.

Motion of the various components, such as the seat cushion 240 and the seat back 238, within the seating assembly of the dynamic seating system 216 can be provided by a combination of mechanical, pneumatic, or other motion-inducing systems, which may be incorporated in the adjusting mechanism 230. Gross positioning of the seat 226 can be achieved using the same motors employed for traditional adjustment of the seat 226, such as motors incorporated in the adjusting mechanism 230. Fine actuation for comfort can be accomplished using a pneumatic system. During rapid adjustments, electric drive motors can be overdriven (by increasing the drive current over "regular" actuation current) to enable quickly reaching the desired position of the seat 226. Additional systems can also be included, such as those powered by single-use, replaceable pressurized cartridges, for example, to quickly deploy the adjustable bolsters 232 into fully expanded states.

Figure 6:
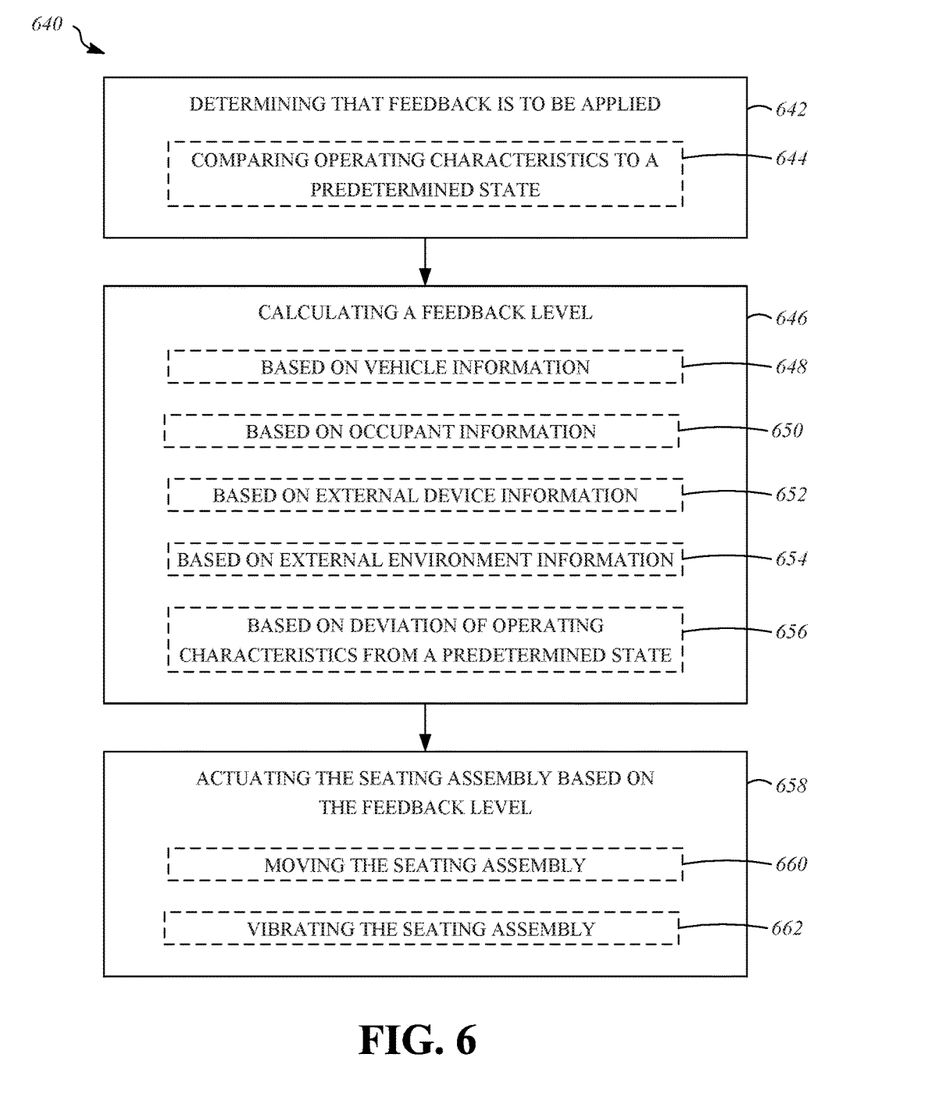
FIG. 6 is a flowchart that shows a process for providing haptic feedback.

FIG. 6 is a flowchart that shows a process 640 for providing haptic feedback. The process 640 may be performed, for example, by the dynamic seating system 216 of FIG. 2.

Operation 642 includes determining that feedback is to be applied. This determination may be based on one or more operating characteristics of the vehicle. In some implementations, operation 642 comprises operation 644, which includes comparing the one or more operating characteristics of the vehicle to a predetermined state. As an example, feedback may be applied in response to determining that the operating characteristics of the vehicle fall outside of ranges included in the predetermined state or differ from values included in the predetermined state by more than a threshold amount.

Operation 646 includes calculating a feedback level. The feedback level represents an amount of haptic feedback that is provided to a user by the system. In some embodiments, multiple discrete feedback levels or states are utilized. In some embodiments, the feedback level may be expressed as one or more values that control the intensity of feedback applied by specific portions of the dynamic seating system 216 of FIG. 2. Calculating the feedback level may be performed using any available information. As an example, calculating the feedback level may be performed as described with respect to the feedback calculation unit 222 of FIG. 2, using information obtained from sources such as the vehicle sensors 218 and the external resources 220.

In some embodiments, calculating the feedback level includes determining whether to utilize each of one or more types of haptic feedback. In some embodiments, calculating the feedback level includes determining an operating parameter, such as intensity or position, for each of the one or more types of haptic feedback. In some embodiments, calculating the feedback level includes selecting a predetermined haptic feedback state from among two or more predetermined haptic feedback states. As an example, the predetermined haptic feedback states may include position settings and bolster inflation settings for a seat, such as the seat 226 of FIG. 2; tension settings for a restraint, such as the restraint 228 of FIG. 2; and the absence, presence, and/or intensity of vibratory feedback.

In some embodiments, operation 646 further comprises operation 648, which includes calculating the feedback level based on vehicle information. The vehicle information may describe operating characteristics of the vehicle, such as vehicle speed, vehicle acceleration, vehicle yaw rate, wheel slip, engine throttle state, and braking state. In some embodiments, operation 646 further comprises operation 650, which includes calculating the feedback level based on occupant information such as age, reaction time, distraction level, drowsiness, gaze-direction, breathing rate, temperature, height, and weight. In some implementations, operation 646 further comprises operation 652, which includes calculating the feedback level based on external device information such as notifications or alerts received from a device. In some implementations, operation 646 further comprises operation 654, which includes calculating the feedback level based on external environment information such as temperature, weather conditions, the time of day, visibility level, and road conditions. In such implementations the intensity of the feedback level may be related to a deviation of the external environment information from predetermined values, such that the intensity of the feedback level increases as the deviation increase. The relationship may be, as examples, expressed as a function that is dependent upon the deviation, or a proportional relationship.

In some embodiments, operation 646 further comprises operation 656, which includes determining the feedback level based on a degree by which vehicle operating characteristics deviate from a predetermined value. Accordingly, higher feedback intensities may be applied in response to higher degrees of deviation according to, as examples, a function or a proportional relationship.

Operation 658 includes actuating the seating assembly based on the feedback level. In some embodiments, actuation of a seat component is caused by transmitting a feedback command to the seat component. The feedback command may be based on, for example, the feedback level that was calculated in operation 646.

In some embodiments, operation 658 includes operation 660, in which actuating the seating assembly includes moving the seating assembly based on the feedback level, such as from a first position to a second position. As one example, moving the seating assembly from the first position to the second position may include repositioning at least a portion of the seating assembly, such as by moving a first portion of the seating assembly with respect to a second portion of the seating assembly, or by moving one or more portions of the seating assembly with respect to a body of the vehicle. As another example, moving the seating assembly from the first position to the second position may include changing an adjustable bolster level of the seating assembly. As another example, moving the seating assembly from the first position to the second position may include changing a tension level of a restraint of the seating assembly. As another example, moving the seating assembly from the first position to the second position may include changing an inflation level of a restraint of the seating assembly.

In some embodiments, operation 658 includes operation 662, in which actuating the seating assembly includes vibrating the seating assembly, such as by applying vibration to one or more components of the seating assembly. The intensity of the vibration may be related to the feedback level, such that vibration intensity increases as the feedback level increases.

What is claimed is:
1. A dynamic seating system, comprising:
one or more vehicle sensors that output information describing one or more operating characteristics of a vehicle;
one or more occupant sensors that output occupant information;
a calculation unit configured to:
determine a feedback level based on deviation of the one or more operating characteristics of the vehicle and deviation of the occupant information from predetermined states,
select a haptic feedback type from predefined haptic feedback types, and
adjust characteristics of the selected feedback type based on the feedback level; and
a seating assembly configured to actuate based on the characteristics of the selected feedback type.

2. The dynamic seating system of claim 1, wherein the seating assembly actuates by moving from a first position to a second position.

3. The dynamic seating system of claim 2, wherein the first position corresponds to absence of feedback and the second position corresponds to presence of feedback and is determined by the characteristics of the selected feedback type.

4. The dynamic seating system of claim 3, wherein the first position is a user-defined position.

5. The dynamic seating system of claim 2, wherein:
the seating assembly includes an adjusting mechanism that is operable to reposition at least a portion of the seating assembly during movement from the first position to the second position based on the characteristics of the selected feedback type.

6. The dynamic seating system of claim 2, wherein:
the seating assembly includes an adjustable bolster that is operable to change a bolster level of the seating assembly during movement from the first position to the second position based on the characteristics of the selected feedback type.

7. The dynamic seating system of claim 2, wherein the seating assembly includes a restraint and a restraint tensioner that is operable to change a tension level of the restraint during movement from the first position to the second position based on the characteristics of the selected feedback type.

8. The dynamic seating system of claim 2, wherein the seating assembly includes a restraint and an inflation system that is operable to change a restraint inflation level of the restraint during movement from the first position to the second position based on the characteristics of the selected feedback type.

9. The dynamic seating system of claim 1, wherein the seating assembly actuates by vibrating one or more components of the seating assembly, and an intensity level of the vibration is based on the feedback level.

10. The dynamic seating system of claim 1, wherein the one or more operating characteristics of the vehicle include at least one of vehicle speed, vehicle acceleration, vehicle yaw rate, wheel slip, engine throttle state, or braking state.

11. The dynamic seating system of claim 1, wherein:
the seating assembly actuates by moving from a first position to a second position,
the first position is a user-defined position that corresponds to absence of feedback and the second position corresponds to presence of feedback,
the seating assembly includes an adjusting mechanism that is operable to reposition at least a portion of the seating assembly during movement from the first position to the second position,
the seating assembly includes an adjustable bolster that is operable to change a bolster level of the seating assembly during movement from the first position to the second position,
the seating assembly includes a restraint and a restraint tensioner that is operable to change a tension level of the restraint during movement from the first position to the second position,
the seating assembly includes an inflation system that is operable to change a restraint inflation level of the restraint during movement from the first position to the second position,
the one or more operating characteristics of the vehicle include at least one of vehicle speed, vehicle acceleration, vehicle yaw rate, wheel slip, engine throttle state, or braking state, and
the occupant information includes at least one of an occupant age, reaction time, distraction level, drowsiness, gaze-direction, breathing rate, temperature, height, or weight.

12. A method for providing haptic feedback, comprising:
receiving information describing one or more operating characteristics of a vehicle;
receiving external information relating to conditions that are external to the vehicle;
determining that feedback is to be applied based on based on the one or more operating characteristics of the vehicle and the external information;
calculating a feedback level based on deviation of the one or more operating characteristics of the vehicle and deviation of the external information from a predetermined state;
selecting a haptic feedback type from predefined haptic feedback types;
adjusting characteristics of the selected feedback type based on the feedback level; and
actuating a seating assembly based on the characteristics of the selected feedback type.

13. The method of claim 12, wherein the external information describes at least one of weather conditions, time of day, visibility, or road conditions.

14. The method of claim 12, wherein the external information describes at least one of traffic information or crash information.

15. The method of claim 12, wherein actuating the seating assembly comprises moving the seating assembly from a first position to a second position, wherein the first position corresponds to absence of feedback and the second position corresponds to presence of feedback and is determined by the characteristics of the selected feedback type.

16. The method of claim 12, wherein the seating assembly actuates by vibrating one or more components of the seating assembly.

17. A method for controlling a seating system, comprising:
receiving information describing one or more notifications;
calculating a feedback command based on the one or more notifications;
selecting a haptic feedback type from predefined haptic feedback types wherein each of the predefined haptic feedback types corresponds to a respective seat component;
adjusting characteristics of the selected feedback type based on the feedback command; and
actuating a seat component corresponding to the selected haptic feedback type based on the characteristics of the selected feedback type by transmitting the feedback command to the seat component.

18. The method of claim 17, wherein the one or more notifications describe at least one of arrival at a destination, presence of a location of interest, an email message, a text message, or a phone call.

19. The method of claim 17, wherein actuating the seat component causes movement of at least a portion of the seat component from a first position to a second position based on the feedback command, wherein the first position corresponds to absence of feedback and the second position corresponds to presence of feedback and is determined by the characteristics of the selected feedback type.

20. The method of claim 17, wherein the seat component actuates by vibrating.

* * * * *

UNITED STATES PATENT AND TRADEMARK OFFICE
CERTIFICATE OF CORRECTION

PATENT NO. : 10,059,228 B1
APPLICATION NO. : 15/269208
DATED : August 28, 2018
INVENTOR(S) : Randol W. Aikin and Filip Ilievski Page 1 of 1

It is certified that error appears in the above-identified patent and that said Letters Patent is hereby corrected as shown below:

In the Claims
In Column 12, Claim Number 12, Line 14:
"is to be applied based on based on the one or more"
Should be:
--is to be applied based on the one or more--.

Signed and Sealed this
Fifth Day of February, 2019

Andrei Iancu
*Director of the United States Patent and Trademark Office*